United States Patent [19]

Buzikievich

[11] Patent Number: 5,701,679

[45] Date of Patent: Dec. 30, 1997

[54] PRISM SUPPORT

[76] Inventor: Steven J. Buzikievich, 54 Nanaimo Avenue East, Penticton, British Columbia, Canada, V2A 1L9

[21] Appl. No.: 647,598

[22] Filed: May 13, 1996

[30] Foreign Application Priority Data

Jan. 25, 1996 [CA] Canada .................. 2,168,176

[51] Int. Cl.$^6$ .................. G01C 15/00
[52] U.S. Cl. .................. 33/293; 33/295
[58] Field of Search .................. 33/293, 294, 295, 33/296, 370, 371, 407, 408

[56] References Cited

U.S. PATENT DOCUMENTS

| | | | |
|---|---|---|---|
| 405,058 | 6/1889 | Thompson | 33/293 |
| 2,245,901 | 6/1941 | Chaskin | 33/295 |
| 2,666,260 | 1/1954 | Schneider et al. | |
| 2,840,913 | 7/1958 | Houser | 33/295 |
| 3,057,250 | 10/1962 | Griffth | |
| 4,339,880 | 7/1982 | Hall | 33/293 |
| 4,428,122 | 1/1984 | Mann | 33/293 |
| 4,803,784 | 2/1989 | Miller | 33/293 |
| 5,255,441 | 10/1993 | Burgess | 33/295 |

*Primary Examiner*—Christopher W. Fulton
*Attorney, Agent, or Firm*—Antony C. Edwards

[57] ABSTRACT

A prism support for stabilizing a prism against a generally vertical fixed surface has a first elongate member removably mountable onto an upper end of a range pole so as to be generally aligned with the range pole when the first elongate member is mounted thereon, generally opposable second and third members rotatably mounted onto said first elongate member, and a cantilevered member selectively rotatably mountable onto the first elongate member for mounting a prism thereon. The second and third members may extend outwardly of the first elongate member, the second member lying in a first plane containing the first elongate member and the third member lying in a second plane containing the first elongate member, the second and third members selectively radially positionable about the first elongate member.

26 Claims, 4 Drawing Sheets

PRISM SUPPORT

FIELD OF THE INVENTION

This invention relates to the field of devices for supporting optical instruments against vertical surfaces to aid in the surveying of those surfaces, and in particular, relates to devices for supporting light reflecting prisms conventionally manually held in place or held in place by means of mounting the prism on top of a range pole.

BACKGROUND OF THE INVENTION

Conventionally, surveyors and engineers using survey instruments work in teams of generally two or more persons. One such person is responsible for holding a pole on top of which is mounted a prism. This pole is conventionally referred to as a range pole, a prism pole, a plumbing pole, or simply a rod. The prism acts to reflect a beam of light from an electronic distance measuring device operated by a surveyor. Conventionally, the surveyor stands apart from the prism so as to measure distances to the prism. In this manner, a point in space, for example the corners of a structure or for that matter any object or feature may be accurately placed in relation to a reference origin or datum, for example, lot lines demarking the perimeter of a piece of land.

Applicant is unaware of any devices, such as the present invention, which will enable the range pole to be placed up against the vertical surface to be measured to thereby support the prism against the vertical surface and remove the requirement that the range pole be manually held. Applicant is aware, however, of two devices in the prior art to assist masons in aligning and locating blocks and the like in relation to the corner of a building structure. U.S. Pat. No. 2,666,260 which issued to Schneider et al on Jan. 19, 1954 for a Bracing System for a Mason Guideline Supporting Column teaches the use of a pair of elongated guide members adapted to be attached to adjacent sides of a building structure adjacent a corner thereof, the guide members having braced arms mounted thereon for adjustment longitudinally of the guide members, and clamp means carried by the brace arms for engagement with a line supporting column to hold the line supporting column plum and in spaced relation to the corner of the building structure.

U.S. Pat. No. 3,057,250 issued Oct. 9, 1962 to Griffith for a Device to Align and Locate Blocks and Cylinders Using Optical Instruments. Griffith discloses a device for use with a transit, the device providing a support having a 90 degree opening for engaging the adjacent sides of a rectangular block or the 90 degree displaced tangent points on the wall of a cylindrical block so as to provide light reflecting or refracting and alignment with each of the walls of the 90 degree V opening. The device may be secured by means of a strap and buckle.

What is neither taught nor suggested is the mounting of a prism atop a range pole by means of a platform which may be levelled relative to the geoid or the direction of the force of gravity, the platform adapted for selectively adjustable bracing against a vertical surface or vertical surfaces forming an angle therebetween.

SUMMARY OF THE INVENTION

A platform is provided for releasable mounting of a prism thereon. The platform is adapted to be mounted atop a range pole in such a way so that when a range pole is propped against a vertical surface the platform may be levelled and securely placed against the vertical surface to thereby stably position the prism. In one preferred embodiment, the platform is secured to a conventional range pole by means of, for example, a standard threaded assembly so as to support in generally longitudinal alignment an elongate hinge pin. The hinge pin supports in hinged relation thereto a pair of elongate vertical surfacing engaging members and a prism supporting member, the pair of vertical surface engaging members and prism supporting member rotatably mounted on the hinge pin so as to rotate in a plane perpendicular to the longitudinal axis of an upper portion of the hinge pin. The upper portion of the hinge pin is pivotable in relation to the range pole and a lower portion of the hinge pin by means, for example, of a universal joint, a single degree of freedom hinge, a resiliently flexible elbow or the like mounted between the upper and lower portions of the hinge pin.

The pair of elongate members for engaging the vertical surface, alternatively referred to as wings, extend outwardly from single degree of freedom hinges mounted in hinged relation along the upper portion of the hinge pin. The wings may be free to rotate about the hinge pin or may be releasably securable by means of a threaded locking collar or the like so as to position the wings in a desired angular relation to each other. The wings may also be releasably secured in, for example, 45 degree increments relative to each other by means of radially spaced-apart detents on a collar or flange extending from the hinge pin, an edge of the wings biased, for example, resiliently biased by means of a spring or the like, into the detents. Alternatively, in a simplified preferred embodiment, the hinge pin is merely a mounting pin to which the wings are fixedly attached in fixed radially spaced relation about the pin, for example at 90 degrees or 270 degrees relative to each other.

The prism supporting elongate member may also be rotatably mounted in the manner of a single degree of freedom hinge to either the hinge pin or the mounting pin. Again, means are provided for releasably securing the elongate member so as to position a prism mounted on the elongate member relative to the hinge pin. In the preferred embodiment, the elongate member is rotatably mounted to the hinge pin at one end of the elongate member and at an opposed end of the elongate member is provided a mounting point for a standard prism such as a standard male thread or post. A level such as a bullseye bubble level and a sighting device may also be mounted on an upper surface of the prism supporting elongate member.

Thus what is provided in one preferred embodiment is a hinge pin which, at its lower most end, may be mounted on a range pole. The hinge pin supports a pair of rotatable wings which may be rotated and releasably secured so as to form, for example, a 90 degree V between the wings so that when the range pole is propped up against, for example, the corner of the building structure, the wings are fixed so as to receive therebetween the corner of the building structure. The universal joint, hinge or other structure which allows the lower portion of the hinge pin to be bent away from, or releasably securably rotated in relation to an upper portion of the hinge pin so that with the range pole propped against the corner of a building structure, the upper portion of the hinge pin will lie flush along the corner of the building. The prism supporting elongate member may then be positioned relative to the corner of the building structure as desired so that a sighting taken against a prism mounted on the elongate member provides the distance, for example, to the plane containing one wall surface or more importantly, the distance to the corner of the building structure. Levelling of the elongate member is facilitated by a bubble level device mounted upon the elongate member.

In summary, the prism support of the present invention may be described as a prism support stabilizing a prism against a generally vertical fixed surface having a first elongate member removably mountable onto an upper end of a range pole so as to be generally aligned with the range pole when the first elongate member is mounted thereon, generally opposable second and third members fixedly or rotatably mounted onto said first elongate member, and a cantilevered member fixedly mounted or selectively rotatably mountable onto the first elongate member for mounting a prism thereon. The second and third members may extend outwardly of the first elongate member, the second member lying in a first plane containing the first elongate member and the third member lying in a second plane containing the first elongate member, the second and third members fixedly radially positioned or selectively radially positionable about the first elongate member.

Advantageously, the prism support of the present invention also has pivot means mounted at a lower end of the first elongate member for pivotable mounting of the first elongate member onto the upper end of the range pole. Further advantageously the cantilevered member is provided with a levelling means mountable thereon and with a sighting means.

DETAILED DESCRIPTION OF THE PREFERRED EMBODIMENT

Figure 1:
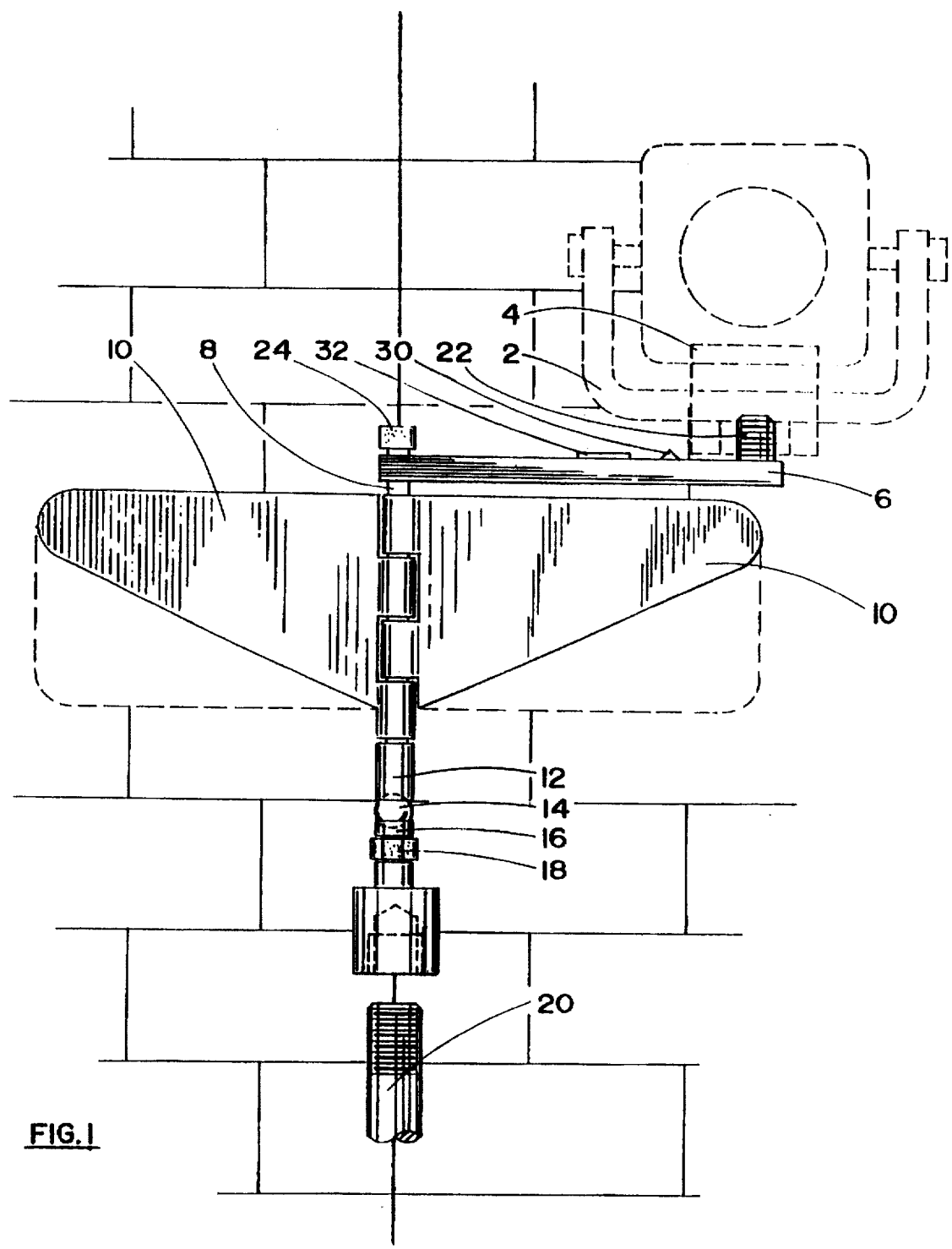
FIG. 1 is, in front elevation view, the prism supporting device of the present invention.
Figure 2:
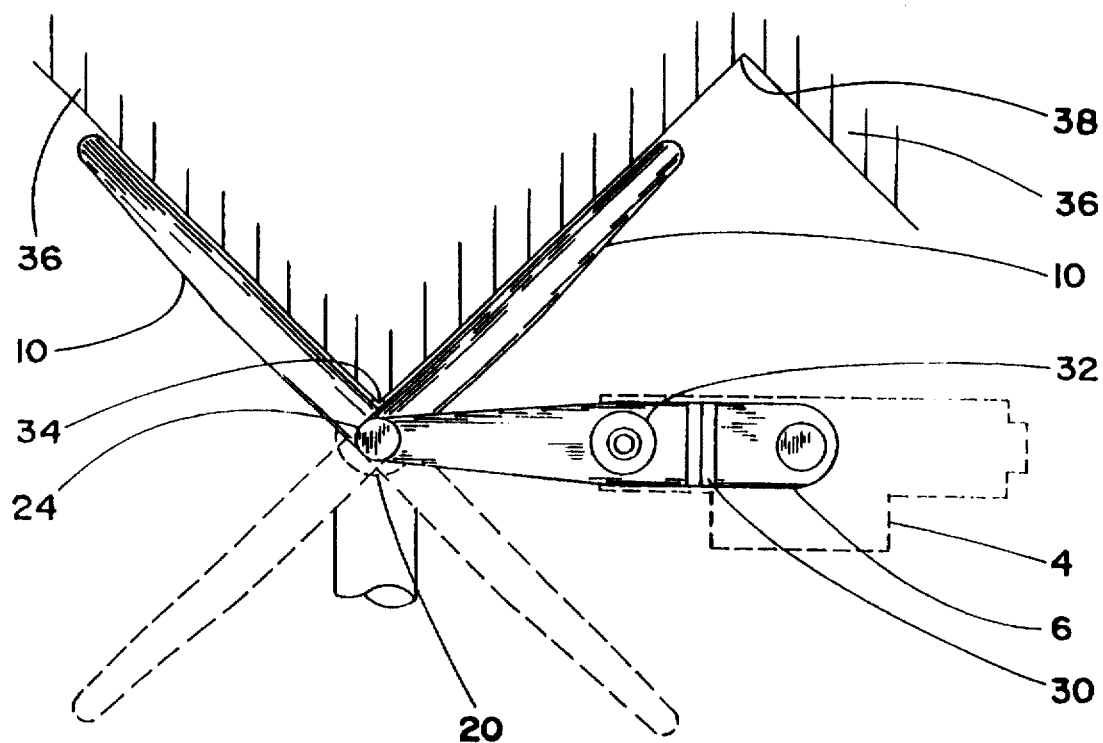
FIG. 2 is, in plan view, the prism supporting device of FIG. 1.

As illustrated in FIGS. 1 and 2, prism support 2 supports prism 4 (shown in dotted outline) on elongate prism supporting member or arm 6. Arm 6 is rotatably mounted on hinge pin 8, preferably at an upper end of hinge pin 8. Also rotatably mounted on hinge pin 8, in the manner of one degree of freedom hinges, are elongate vertical surface engaging members or wings 10 which may be, as illustrated, generally triangular in shape or, if greater stability against a vertical surface is required, rectangular as depicted in dotted outline. It is understood that wings 10 may be of any shape in order to assist stabilizing prism support 2 against generally vertical or other surfaces.

Sleeve 12 may be threadably mounted on hinge pin 8 or otherwise secured to hinge pin 8 so as to provide a socket mounting for universal ball joint 14. A lower portion of hinge pin 8 depends downwards from universal ball joint 14 and in particular sleeve 16 provides a lower socket in which universal ball joint 14 is seated. Sleeve 16 may be releasably biased into frictionally engagement with universal ball joint 14 by threaded collar 18 to thereby releasably secure the lower portion of hinge pin 8 relative to the upper portion of hinge pin 8 about universal ball joint 14.

A threaded coupling is mounted at the lower-most end of the lower portion of hinge pin 8 for releasable mounting of prism support 2 on range pole 20.

Arm 6 has prism 4 releasably mounted thereon by means of threaded member 22. Threaded member 22 may also be a post if prism 4 is a Leica(tm) prism. Arm 6 may be rotated about hinge pin 8 and releasably secured in a desired radial position by, for example, tightening threaded knob 24 down onto the uppermost hinge pin 8 to thereby frictionally engage arm 6 and wings 10 in frictional engagement against sleeve 12. The position of arm 6 and wings 10 may thereby releasably locked into place. It is understood that arm 6 may be any form of cantilevered structure for mounting prism 4 onto hinge pin 8.

Figure 3:
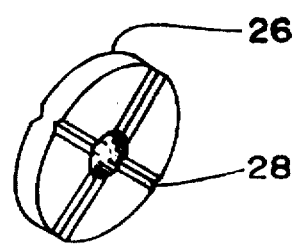
FIG. 3 is, in perspective view, a detent collar of a preferred embodiment of the present invention.

Alternatively, a detent ring or collar 26 such as illustrated in FIG. 3 may also be mounted onto hinge pin 8. In one embodiment collar 26 is rigidly mounted onto hinge pin 8 between arm 6 and wings 10. The detents 28 which are illustrated at 90 degree radially spaced-apart intervals may advantageously be placed at 15 degree radially spaced-apart intervals (or other radial intervals) so that vertically protruding flanges (not shown) on wings 10 and arm 6 may seat in detents 28 to thereby releasably lock the rotational position of wings 10 and arm 8 by the tightening threaded knob 24 onto hinge pin 8.

In the preferred embodiment a sighting device 30 or any other line of sight sighting device such as conventional rifle sighting devices and the like, is mounted onto an upper surface of arm 6. Sighting device 30 is aligned perpendicular to the longitudinal axis of arm 6 so that a line of sight alignment of sighting device 30 with a surveyor measuring the distance from the surveyor to prism 4 will be measuring the distance at right angles to arm 6. In this manner, when arm 6 is aligned with a vertical surface, for example, one side of the corner of a building structure, the distance measured by the surveyor to prism 4 will be the distance from the surveyor to that vertical surface aligned with arm 6 subject to a calculation for the known offset distance along arm 6.

Also advantageously mounted onto arm 6 is levelling device 32 which may, as illustrated, be a bulls-eye bubble level or any other conventional levelling device whether it be a bubble level or otherwise. A bulls-eye bubble level has the advantage that prism support 2 may be levelled in 2 degrees of freedom by the use of a single levelling device 32 mounted on arm 6. As illustrated in FIG. 2, wings 10 may be relatively thin when viewed vertically and planar so as to enable wings 10 to be inserted behind drainpipes, downspouts, trees, foliage, lattice work or like objects which typically interfere with the placement of a prism into locations where it is desired to measure close against the side of a building. Thus, although prism support 2 as illustrated in FIG. 2 has wings 10 positioned to stabilize arm 6 and prism 4 on an outside corner 34 of building structure 36, wings 10 might be adjusted into the position shown in dotted outline if it was desired to survey the location of an inside corner, such as inside corner 38. Arm 6 in that situation might be positioned so as to align arm 6 longitudinally along the line of sight to the surveyor, enabling the surveyor to take a distance measurement to prism 4 and compute the distance to inside corner 38 by merely adding the length of arm 6 to the measured distance to prism 4.

Whether wings 10 may be click-stopped at preset radial increments such as by detents 28 or otherwise selectively positioned by the frictional engagement of threaded knob 24 against arm 6, in turn frictionally engaging wings 10, wings 10 may be selectively positioned to stabilize arm 6 against a vertical surface of any shape, for example, the curved vertical surfaces of power poles, trees and the like. So long as the surface areas of wings 10 are large enough to provide stabilizing frictional engagement sufficient that, with wings 10 selectively locked so as to as closely as possible conform to the shape of vertical surface, and with range pole canted outwards such as depicted in FIG. 2 so as prop prism support 2 against the vertical surface, prism 4 may be stably supported on arm 6. Alternatively, for better stabilization against non-planar surfaces, wings 10 may have corresponding non-planar contact surfaces.

Alteratively, in a complimentary preferred embodiment, arm 6 may be telescoping so that the distance between hinge pin 8 and prism 4 may be reduced in situations where it is difficult to stabilize prism support 2 against a vertical surface or in situations where it is necessary to clear obstructions to visibility of the surveyor, the length of arm 6 being reduced to decrease the bending moment being applied by the weight of prism 4 cantilevered from hinge pin 8.

In the preferred embodiment and as depicted in FIG. 2, arm 6 may be tapered where at the end of arm 6 is rotatably mounted to hinge pin 8, or otherwise shaped so that arm 6 does not interfere with the placement of a vertical surface such as outside corner 34 into the vertex formed between wings 10.

Figure 4:
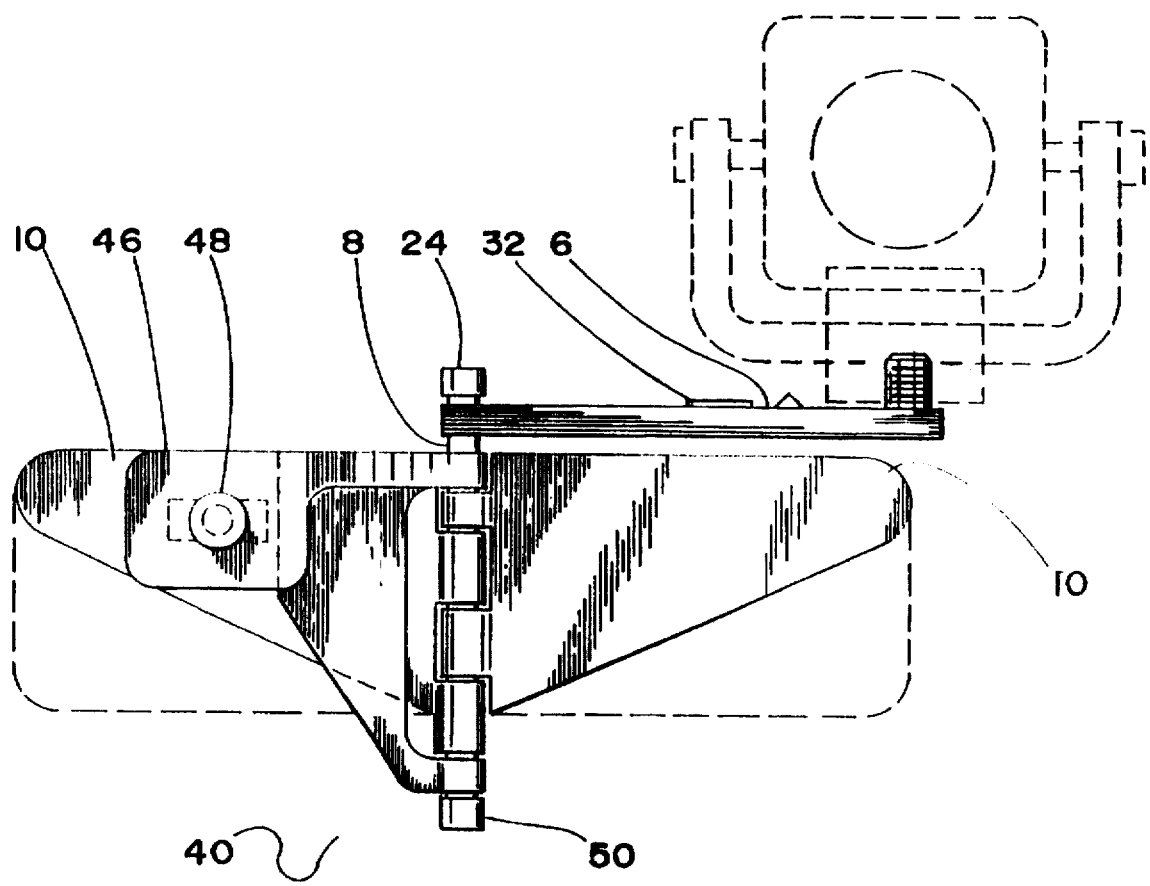
FIG. 4 is, in front elevation view, an alternative embodiment of the prism supporting device of the present invention.
Figure 5:
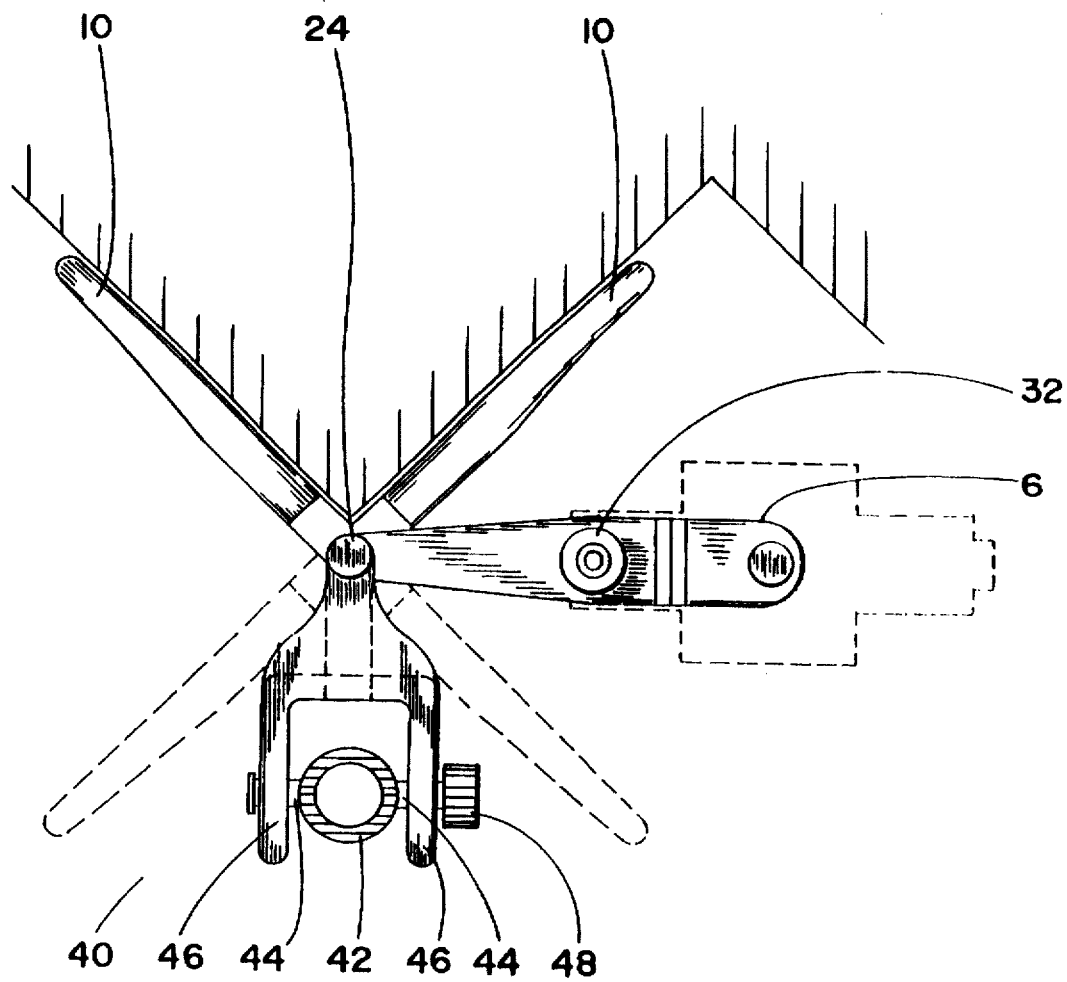
FIG. 5 is, in plan view, the prism supporting device of FIG. 4 with the range pole bracket rotated 90 degrees.

In the alternative embodiment depicted FIGS. 4 and 5, universal ball joint 14 and the structure depending downwards therefrom for mounting prism support 2 onto range pole 20 such as depicted in FIG. 1, is replaced by range pole bracket 40 selectively rotatably mounted on hinge pin 8. Range pole 20 (not shown in FIGS. 4 and 5) may, at its uppermost end, be mounted onto collar 42 such as by a standard threaded engagement, or by a post-and-hole fitting within collar 42 or otherwise as conventionally known. Collar 42 is mounted between axles or pivot pins 44. Advantageously, pivot pins 44 may be rigidly mounted to collar 42, and extend in opposed directions from collar 42 so as to be journalled through bearings or otherwise through conventionally known axle or pivotable mountings in bracket flanges 46.

Further advantageously, the rotational position of collar 42 may be selectively releasably locked by a locking mechanism such as friction locking knob 48. Thus range pole 20 may be canted outwards from prism support 2 so as to prop prism support 2 against a vertical surface. Once prism support 2 is level, the position of range pole 48 may be locked into place by means of frictionally locking knob 48 being tightened, for example, by means of threaded engagement along pivot pins 44 so as to engage frictional locking knob 48 against the outer surface of bracket flanges 46.

A similar frictional locking knob 50 may be provided in threaded engagement on the lower most end of hinge pin 8 so that the rotational position of range pole 40 on hinge pin 8 may be releasably locked to thereby assist supporting prism support 2 against a vertical surface.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A prism support for stabilising a prism against a generally vertical fixed surface comprises:

a first elongate member removably mountable onto an upper end of a range pole so as to be generally aligned with said range pole when the first elongate member is mounted thereon, generally opposable second and third members mounted onto said first elongate member in radially spaced apart relation about said first elongate member, said second and third members extending outwardly of said first elongate member, said second member lying in a first plane containing said first elongate member, said third member lying in a second plane containing said first elongate member, a cantilevered member selectively rotatably mountable onto said first elongate member for mounting of a prism thereon.

2. The prism support of claim 1 further comprising pivot means mounted at a lower end of said first elongate member for pivotable mounting of said first elongate member onto said upper end of said range pole.

3. The prism support of claim 2 wherein said first elongate member is a hinge pin, and said second and third members are thin generally planar wings rotatably mountable on said hinge pin whereby said second and third members may be rotated about said hinge pin, when rotatably mounted on said hinge pin, into radially spaced apart relation.

4. The prism support of claim 3 wherein said cantilevered member is an arm cantilevered radially outwards from said hinge pin, said arm adapted at its outermost end to receive a prism in releasable mating engagement thereon.

5. The prism support of claim 4 wherein said arm is a telescoping arm.

6. The prism support of claim 4 wherein said arm further comprises a sight perpendicularly mounted on said arm for line of sight sighting in a generally horizontal plane along a line generally perpendicular to a longitudinal axis of said arm.

7. The prism support of claim 4 wherein said pivot means if a selectively positionable ball joint.

8. The prism support of claim 4 wherein said pivot means is a selectively positionable hinge.

9. The prism support of claim 4 wherein said pivot means is a flexible elbow.

10. The prism support of claim 4 wherein said wings are rotatably mounted on said hinge pin in the manner of one degree of freedom hinges;

and are selectively radially positionable by means of a threaded collar threadably mounted on said hinge pin for frictional engagement of said threaded collar against said wings.

11. The prism support of claim 10 further comprising detent means mounted on said hinge pin, said detent means having a radially spaced apart array of radially extending detents, said detent means cooperating with said wings, bias means for biasing said wings against said detent means whereby when said wings are biased against said detent means, said wings may be incrementally radially positioned on said detent means about said hinge pin.

12. The prism support of claim 11 wherein said detent means is a collar having radially spaced apart detents at 15° increments.

13. The prism support of claim 2 wherein said elongate member is a hinge pin and said second and third members are thin curved wings generally shaped so as to conform to a non-planar generally vertical surface.

14. The prism support of claim 13 wherein said wings are generally triangular in plan form.

15. The prism support of claim 13 wherein said wings are generally rectangular in plan form.

16. The prism support of claim 1 further comprising means for releasably mounting said first elongate member onto an upper end of a range pole, said means for releasably mounting said first elongate member onto an upper end of a range pole comprising a bracket selectively rotatably mounted onto said first elongate member at a first end of said bracket, a pivotable range pole mounting means pivotably mounted to said bracket and adapted to receive in releasable engagement at a second end of said bracket, opposed to said first end of said bracket, said upper end of said range pole.

17. The prism support of claim 16 wherein said pivotable range pole mounting means comprises a collar pivotably mounted on said second end of said bracket.

18. The prism support of claim 1 wherein said cantilevered member has a level mountable thereon.

19. The prism support of claim 18 wherein the level is a bubble level mounted on said canlilevered member.

20. The prism support of claim 1 wherein said cantilevered member has a sighting device mounted thereon.

21. The prism support of claim 3 wherein said wings are generally triangular in plan form.

22. The prism support of claim 3 wherein said wings are generally rectangular in plan form.

23. The prism support of claim 2 wherein said cantilevered member has a level mountable thereon.

24. The prism support of claim 3 wherein said cantilevered member has a level mountable thereon.

25. The prism support of claim 2 wherein said cantilivered member has a sighting device mounted thereon.

26. The prism support of claim 3 wherein said cantilivered member has a sighting device mounted thereon.

* * * * *